(12) United States Patent
Lukes et al.

(10) Patent No.: US 10,968,939 B2
(45) Date of Patent: *Apr. 6, 2021

(54) TAPERED LOBULAR DRIVER AND FASTENER

(71) Applicant: INFASTECH INTELLECTUAL PROPERTIES PTE. LTD., Singapore (SG)

(72) Inventors: Richard W. Lukes, Calmar, IA (US); Donald K. Blaess, Cresco, IA (US)

(73) Assignee: Infastech Intellectual Properties Pte. Ltd., Singapore (SG)

( * ) Notice: Subject to any disclaimer, the term of this patent is extended or adjusted under 35 U.S.C. 154(b) by 1445 days.

This patent is subject to a terminal disclaimer.

(21) Appl. No.: 14/483,498

(22) Filed: Sep. 11, 2014

(65) Prior Publication Data
US 2015/0000479 A1 Jan. 1, 2015

Related U.S. Application Data

(63) Continuation-in-part of application No. 13/593,103, filed on Aug. 23, 2012.
(Continued)

(51) Int. Cl.
*B25B 13/48* (2006.01)
*F16B 23/00* (2006.01)
*B25B 15/00* (2006.01)

(52) U.S. Cl.
CPC .......... *F16B 23/003* (2013.01); *B25B 15/004* (2013.01); *B25B 15/005* (2013.01); *F16B 23/0053* (2013.01)

(58) Field of Classification Search
CPC .. F16B 23/003; F16B 23/0053; B25B 13/065; B25B 15/004; B25B 15/005; B25B 15/007; B25B 15/02; B25B 15/008
(Continued)

(56) References Cited

U.S. PATENT DOCUMENTS

| 145,411 A | 12/1873 | Frearson |
|---|---|---|
| 2,066,484 A | 1/1935 | Phillips |

(Continued)

FOREIGN PATENT DOCUMENTS

| EP | 1655101 | 10/2006 |
|---|---|---|
| IL | 231161 | 6/2018 |

(Continued)

OTHER PUBLICATIONS

International Search Report and Written Opinion for PCT/US2012/052084.
(Continued)

*Primary Examiner* — Joseph J Hail
*Assistant Examiner* — Shantese L McDonald
(74) *Attorney, Agent, or Firm* — Lorraine Hernandez; Kegler, Brown, Hill & Ritter Co., LPA

(57) ABSTRACT

A torque transmission driver has a first end portion adapted to receive and transmit torque from a torque generation source, and a second end portion including a shaped tapered bit having drive surfaces with an alternating series of five or six lobes and troughs about a rotational axis, having a taper angle between 15 and 65° from the rotational axis operable to engage corresponding drive surfaces in a plurality of at least two size fasteners, the tapered drive surfaces of the bit comprising a first tapered portion operable to engage drive surfaces of a first sized fastener and a second tapered portion operable to engage drive surfaces of a second sized fastener, the drive surfaces of the second sized fastener being larger than the drive surfaces of the first sized fastener. The taper angle may be nominally 52° from the rotational axis.

43 Claims, 8 Drawing Sheets

Related U.S. Application Data

(60) Provisional application No. 61/585,037, filed on Jan. 10, 2012, provisional application No. 61/527,603, filed on Aug. 25, 2011.

(58) Field of Classification Search
USPC .......................................... 81/404, 436, 460
See application file for complete search history.

(56) References Cited

U.S. PATENT DOCUMENTS

| | | | |
|---|---|---|---|
| 2,046,837 A | | 7/1936 | Phillips |
| 2,046,838 A | | 7/1936 | Phillips |
| 2,046,839 A | | 7/1936 | Phillips et al. |
| 2,046,840 A | | 7/1936 | Phillips et al. |
| 2,285,460 A | | 6/1942 | Purtell |
| 2,397,216 A | | 3/1946 | Stellin |
| 2,969,250 A | | 1/1961 | Kull |
| 3,187,790 A | | 6/1965 | Wing |
| 3,584,667 A | | 6/1971 | Reiland |
| 3,763,725 A | | 10/1973 | Reiland |
| 3,812,757 A | | 5/1974 | Reiland |
| 3,884,282 A | | 5/1975 | Dobrosielski |
| 4,006,660 A | | 2/1977 | Yamamoto et al. |
| 4,128,038 A | | 12/1978 | Urwin |
| 4,269,246 A | | 5/1981 | Larson et al. |
| 4,325,153 A | | 4/1982 | Finnegan |
| 4,464,957 A | * | 8/1984 | Gill ................... B25B 15/005 81/460 |
| 4,503,737 A | * | 3/1985 | DiGiovanni ......... B25B 15/008 81/436 |
| 4,528,874 A | | 7/1985 | Dunn |
| 4,878,406 A | | 11/1989 | Simpson et al. |
| 4,970,922 A | * | 11/1990 | Krivec ................. B25B 15/005 81/451 |
| 5,025,688 A | | 6/1991 | Davis |
| 5,137,407 A | * | 8/1992 | Yamamoto ............ F16B 23/003 411/404 |
| 5,207,132 A | | 5/1993 | Goss et al. |
| 5,224,402 A | | 7/1993 | Pettersson |
| 5,237,893 A | | 8/1993 | Ryder et al. |
| 5,279,190 A | | 1/1994 | Goss et al. |
| 5,291,811 A | * | 3/1994 | Goss ................... B25B 13/065 411/404 |
| 5,353,667 A | | 10/1994 | Wilner |
| 5,367,926 A | | 11/1994 | Mikic et al. |
| 5,435,680 A | | 7/1995 | Schuster |
| 5,461,952 A | | 10/1995 | Goss |
| 5,509,334 A | * | 4/1996 | Shinjo ................. B25B 15/005 81/436 |
| 5,513,933 A | | 5/1996 | Rom |
| 6,016,727 A | | 1/2000 | Morgan |
| 6,158,310 A | * | 12/2000 | Goss ................... B25B 13/065 411/402 |
| 6,223,634 B1 | * | 5/2001 | Hughes ................ B25B 15/005 411/404 |
| 6,367,358 B1 | | 4/2002 | Stacy |
| 6,378,406 B1 | | 4/2002 | Totsu |
| 6,393,953 B1 | | 5/2002 | Totsu |
| 6,477,923 B2 | | 11/2002 | Amis |
| 6,584,876 B2 | | 7/2003 | Totsu |
| 6,601,482 B2 | | 8/2003 | Hughes et al. |
| 6,685,412 B2 | | 2/2004 | Altarac et al. |
| 6,857,340 B2 | | 2/2005 | Wagner |
| 6,868,572 B1 | | 3/2005 | Newton |
| 6,886,431 B1 | | 5/2005 | Petrsorich |
| 6,886,433 B2 | | 5/2005 | Totsu |
| 7,165,482 B2 | | 1/2007 | Shapoval |
| 7,188,554 B2 | | 3/2007 | Baynham |
| 7,225,710 B2 | | 6/2007 | Pacheco, Jr. |
| 7,311,026 B2 | | 12/2007 | Melton |
| 7,325,470 B2 | | 2/2008 | Kay et al. |
| 7,690,282 B2 | | 4/2010 | Griffiths |
| 7,708,767 B2 | | 5/2010 | Contiliano et al. |
| 7,730,812 B2 | * | 6/2010 | Edland ................. B25B 15/005 411/404 |
| 7,793,573 B2 | | 9/2010 | Gao |
| 2001/0025552 A1 | | 10/2001 | Wagner |
| 2005/0047891 A1 | | 3/2005 | Toyooka et al. |
| 2005/0166724 A1 | | 8/2005 | Castaneda |
| 2006/0266168 A1 | * | 11/2006 | Pacheco, Jr. .......... B25B 13/065 81/460 |
| 2007/0245863 A1 | | 10/2007 | Edland |
| 2008/0092699 A1 | | 4/2008 | Surowiecki |
| 2008/0159827 A1 | | 7/2008 | Edland |
| 2008/0226423 A1 | | 9/2008 | Brooks |
| 2009/0260489 A1 | | 11/2009 | Siong |
| 2010/0129176 A1 | | 5/2010 | Karupaya |
| 2010/0192736 A1 | | 8/2010 | Burch et al. |
| 2010/0269644 A1 | | 10/2010 | Edland et al. |
| 2013/0213193 A1 | | 8/2013 | Lukes |

FOREIGN PATENT DOCUMENTS

| | | |
|---|---|---|
| JP | 2014524364 | 9/2014 |
| WO | 2010101341 | 10/2010 |
| WO | 2013028875 | 2/2013 |

OTHER PUBLICATIONS

International Search Report and Written Opinion for PCT/US2011/043198.

Select-A-Bit Multi Drivers / Nut Drivers, http://www.klenktools.com/main/products/multidriversnew.asp, Jan. 27, 2011.

* cited by examiner

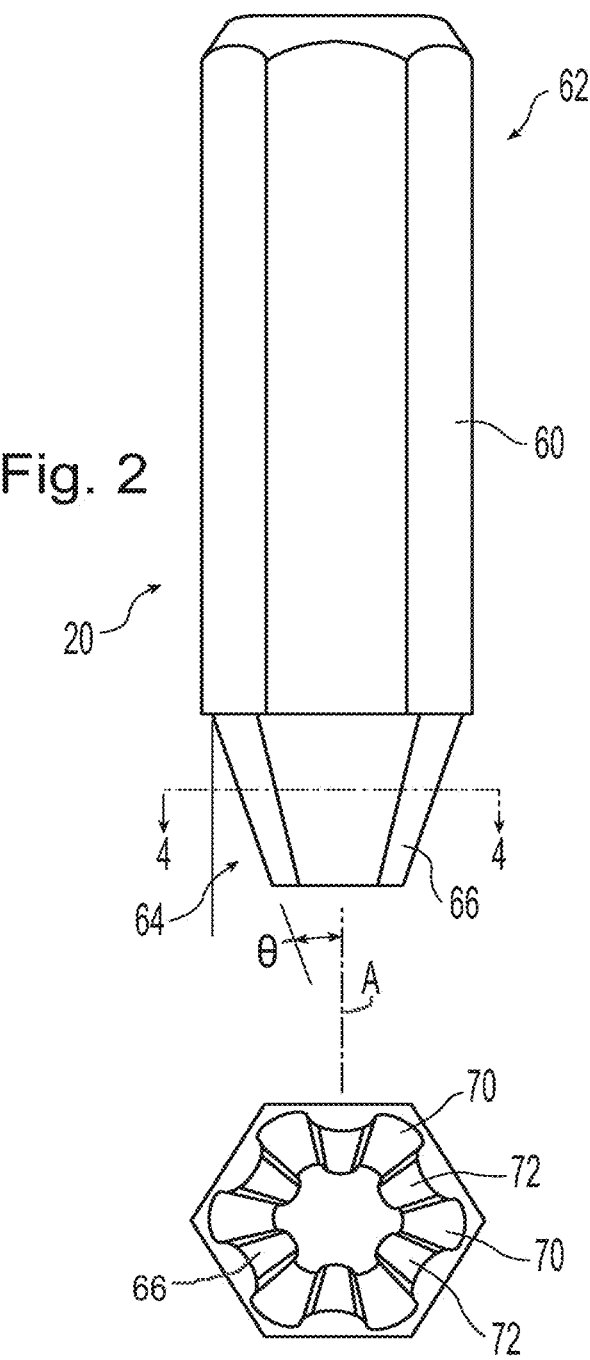
Fig. 2
Fig. 3
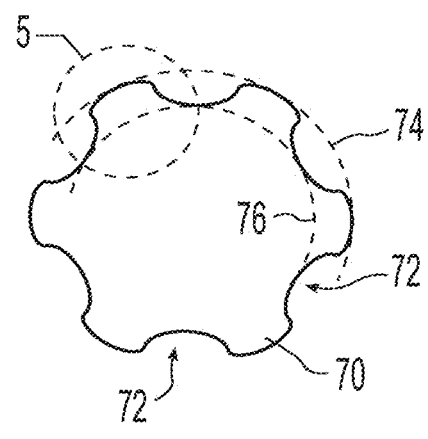
Fig. 4
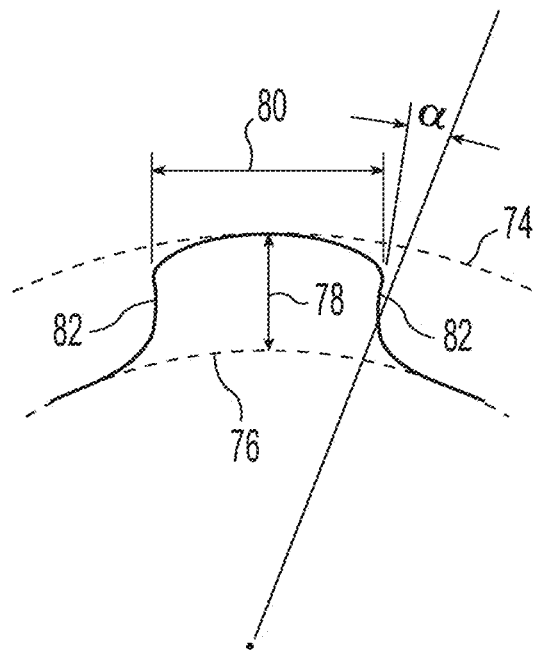
Fig. 5

TAPERED LOBULAR DRIVER AND FASTENER

This patent application is a continuation-in-part of U.S. patent application Ser. No. 13/593,103, filed on Aug. 23, 2012, which claims the benefit of U.S. Provisional Patent Application 61/527,603 filed on Aug. 25, 2011, and U.S. Provisional Patent Application 61/585,037 filed on Jan. 10, 2012, each of which are incorporated herein by reference.

BACKGROUND AND SUMMARY

The present invention is directed to a torque transmission driver used to transmit torque from a torque generating source, such as a power driver, to a fastener for assembly of a structure or device.

Torque transmission drivers for torque transmitting systems and fasteners used in those systems are well-known in the art. The bit of the driver had a recess or a projection of a particular shape which fit a complimentary shaped projection or recess in the fastener. One of the more commonly known torque transmitting systems was the cruciform type drive system commercialized as the PHILLIPS® drive system. See for example, U.S. Pat. No. 2,046,837. Numerous forms and shapes of torque transmitting drive systems have been proposed. See for example, U.S. Pat. No. 2,397,216.

Spline-type torque transmitting systems of four-lobe, five-lobe and six-lobe have been well-known. Examples of these four-lobe, five-lobe and six-lobe torque transmitting systems, with their fasteners and drivers, are described in U.S. Pat. Nos. 2,969,250; 3,187,790; 3,584,667; 4,970,922 and 5,279,190. Early versions of such spline-type torque transmission drive systems had square corners, for which corresponding fastener recesses were difficult and expensive to make and resulted in stresses in the fastener and/or driver which lead to fatigue failure with repeated use. Later versions of five and six lobe spline type torque drive systems had a plurality of intersecting oppositely curved surfaces evenly positioned about the 360° circumference of the fastener head or driver bit to form an alternating series of lobes and flutes. These latter torque drive systems overcame some of the problems inherent in the earliest spline type systems, but were not generally capable of retaining a lobe drive angle less than five degrees. Upon application of higher torques, force components would rise causing failure or strip out of the lobes from the fasteners or the drivers. One version of these later spline type torque drive systems, known commercially as the TORX® drive system, had six-lobe and five-lobe configurations based on mating arcuate surfaces designed to attain drive angles within the range of 10° to 20°. See U.S. Pat. No. 3,584,667.

A later version of this spline type torque transmission drive system reduced the drive angle to zero by having both the driven surfaces of the fastener head and the drive surfaces of the torque driver formed by a first series of elliptically curved surfaces with a second series of elliptically curved surfaces alternating there between. One series of these elliptically curved surfaces was convex, while the alternating series of elliptically curved surfaces was concave. The alternating concave and convex elliptically curved surfaces merged smoothly and tangentially to define a series of alternating flutes and lobes extending about the 360° circumference of the fastener head or the driver bit. Both the lobes and the flutes of the fastener head and driver bit were elliptically curved in section. Also, the centers of the elliptically curved lobes and corresponding centers of the elliptically curved flutes were disposed at the apexes of a regular hexagon, although not the same hexagon, due to the alternating nature of these components. See U.S. Pat. No. 5,279,190. An embodiment of this lobular torque transmission drive system has been commercially marketed as the TORX PLUS® drive system.

Certain prior torque transmission drivers have been limited by their dedication to one or a limited number of sizes of fastener having drive surfaces, with recess or projections, corresponding to the size of the driver. For example, the lobular fastener marketed under the brand name TORX® required a separate driver of a diameter to match each size of corresponding fastener. This meant that a set of the drivers had to be maintained on site by assemblers, and each time a different size fastener was installed a different size bit was retrieved from the set and installed in a torsion gun. For example, a T-1 TORX® driver was required to drive a T-1 TORX® fastener, and a T-2 TORX® driver was required to drive a T-2 TORX® fastener, and so on. Other fastener systems, such as a cruciform type system sold under the brand name PHILLIPS®, could drive more than one size fastener, but these systems were susceptible to driver cam-out from the fastener. Cam-out is a rotational lifting movement by which the driver lifts out of the fastener recess, caused when the fastener and the driver have angled surfaces that enable sliding movement between the surfaces. Cam-out by the prior torque transmission systems caused damage to the fasteners and drivers, prevented fasteners from being tightened to a proper torque, as well as generated shavings and burrs that damaged components in the assembly.

The prior systems created inefficiency for assemblers who install fasteners of different sizes who have to pick up one driver to install one size fastener and pick up another driver to install another size fastener, or alternatively attempt to drive a fastener with the wrong size driver or a driver that cams out, which added to the difficulty where not impossible. Driving a fastener with a driver that was too large or too small for the fastener prevented the driver from seating properly increasing the prospect of cam-out of the driver from the fastener, strip-out or shearing of the fastener recess or projections, and/or improperly torqued fastener installation. This presented inefficiency and waste in installation and an increased incidence of mis-installed fasteners in assemblies and failure of the assemblies. Tapered drive systems in the past of the cruciform type, e.g. PHILLIPS® drivers, were well know to cam out of fasteners under torque, causing damage to and waste of fasteners or drivers, with decreased efficiency and increased incidence of mis-installed fasteners and misassembly of products, devices and machines. Additionally, the prior spline-type systems were less effective with thread forming and thread cutting fasteners because the drivers tended to cam out of the fastener and the drivers wobbled in the fasteners not maintaining axial alignment. All of these problems were accentuated in extremely small size fastener heads and torsion drivers, particularly for fasteners with a major thread diameter smaller than about 0.063 inch (1.6 millimeter), and more particularly for fasteners with a major thread diameter smaller than about 0.039 inch (1.0 millimeter) In addition to the problems discussed above, such small fasteners tended to deform when in use because of the small size of the fasteners, the sizes of the lobes, and the clearance tolerances involved.

What is disclosed is a torque transmission driver having a main body having a first end portion and a second end portion,
the first end portion adapted to receive and transmit torque from a torque generation source, the second end portion opposite the first end portion comprising a shaped tapered bit having drive surfaces comprising an alternating series of five or six lobes and troughs about a rotational axis having tapered drive surfaces with a taper angle between 15 and 65° from the rotational axis operable to engage corresponding drive surfaces of similar shape and taper in a plurality of at least two size fasteners, the tapered drive surfaces of the bit comprising a first tapered portion operable to engage drive surfaces of a first sized fastener and a second tapered portion operable to engage drive surfaces of a second sized fastener, the drive surfaces of the second sized fastener being larger than the drive surfaces of the first sized fastener, each lobe having a tapered height and width with a substantially constant ratio of lobe width to height.

In one alternative, the drive surfaces may have four lobes and troughs.

The bit drive surfaces include a drive side transition between each lobe and the trough on at least one side of each lobe having a drive angle adapted to engage a corresponding fastener surface. The drive angle of the drive side transition may be between 0° and 5°. In some embodiments, the drive angle may be less than zero degrees, such as between 0° and −10°, or between −2° and −10°. The drive side transition may be between about 20% and 60% of the lobe height.

The fastener drive surfaces may form a recess, and the tapered bit is operable to engage at least two sizes of fastener drive surfaces. In an alternative, the fastener drive surfaces form a projection, and the tapered bit is operable to engage at least two sizes of fastener drive surfaces.

The tapered drive surfaces of the torque transmission driver may have a taper angle between 20° and 40° from the rotational axis, between 30° and 40° from the rotational axis, between 45° and 65° from the rotational axis, between 55° and 65° from the rotational axis, between 45° and 55° from the rotational axis, or between 50° and 55° from the rotational axis.

Also disclosed is a fastener system including
a plurality of fasteners having a mix of at least two sizes of tapered drive surfaces, each fastener having a drive end portion with the tapered drive surfaces and a lead end portion,
the drive end portion of each fastener operable to engage a torque transmission driver and the lead portion operable to fasten the fastener,
the fastener drive surfaces comprising an alternating series of five or six fastener lobes and fastener troughs about a rotational axis and having a taper angle between 15 and 65° from the rotational axis operable to engage corresponding drive surfaces of a similar shape and taper on the torque transmission driver, each fastener lobe of the drive surfaces having a tapered height and width with a substantially constant ratio of lobe width to height,
a torque transmission driver comprising a main body having a first end portion and a second end portion,
the first end portion adapted to receive and transmit torque from a torque generation source,
the second end portion opposite the first end portion comprising a shaped tapered bit comprising a series of alternating five or six driver lobes and driver troughs about a rotational axis forming tapered bit drive surfaces having a taper angle between 15 and 65° from the rotational axis operable to engage the at least two sizes of drive surfaces of the plurality of fasteners,
the tapered drive surfaces of the bit having a first tapered portion operable to engage drive surfaces of a first sized fastener and a second tapered portion adapted to engage drive surfaces of in a second sized fastener, the drive surfaces of the second sized fastener being larger than the drive surfaces of the first sized fastener, each driver lobe having a tapering height and width with a substantially constant ratio of lobe width to height,
the driver lobes and troughs of the driver complimentingly engaging the fastener troughs and lobes of the fasteners.

In one alternative, the bit drive surfaces and corresponding fastener drive surfaces may have four lobes and troughs.

Each of the at least two sizes of fastener drive surfaces may have at least one cross section substantially the same. The bit drive surfaces include a drive side transition between each lobe and the trough on at least one side of each lobe having a drive angle adapted to engage a corresponding fastener surface. The drive angle of the drive side transition may be between 0° and 5°. In some embodiments, the drive angle may be less than zero degrees, such as between 0° and −10°, or between −2° and −10°. The drive side transition may be between about 20% and 60% of the lobe height.

The fastener drive surfaces may form a recess, and the tapered bit is operable to engage the at least two sizes of fastener drive surfaces. In an alternative, the fastener drive surfaces form a projection, and the tapered bit is operable to engage the at least two sizes of fastener drive surfaces.

In some embodiments, the tapered drive surfaces of the torque transmission driver may have a taper angle between 20° and 40° from the rotational axis, between 30° and 40° from the rotational axis, between 45° and 55° from the rotational axis, between 50° and 55° from the rotational axis, between 55° and 65° from the rotational axis, or between 45° and 65° from the rotational axis. In some embodiments the tapered drive surfaces of the torque transmission driver may have a taper angle that is nominally 45° or nominally 52°.

Additionally, the present disclosure includes a selection of a plurality of fasteners including
a plurality of fasteners having a mix of at least two sizes of tapered drive surfaces, each of the at least two sizes of drive surfaces having a similar cross-sectional shape, each fastener having a drive end portion and a lead end portion,
the drive end portion of each fastener operable to engage a torque transmission driver and the lead portion operable to fasten the fastener,
the drive end portion of each fastener comprising a alternating series of five or six lobes and troughs about a rotational axis forming the tapered drive surfaces having a taper angle between 15 and 65° from the rotational axis operable to engage corresponding drive surfaces of similar shape and taper on the torque transmission driver, each lobe of the drive surfaces having a tapered height and width with a substantially constant ratio of lobe width to height.

In one alternative, the tapered drive surfaces may have four lobes and troughs.

Each of the at least two sizes of tapered drive surfaces may have at least one cross section substantially the same. The fastener drive surfaces include a drive side transition between each lobe and the trough on at least one side of each lobe having a drive angle adapted to engage a corresponding driver surface. The drive angle of the drive side transition may be between 0° and 5°. In some embodiments, the drive angle may be less than zero degrees, such as between 0° and −10°, or between −2° and −10°. The drive side transition may be between about 20% and 60% of the lobe height.

The fastener drive surfaces may form a recess. Alternatively, the fastener drive surfaces form a projection. In some embodiments, the tapered drive surfaces may have a taper angle between 20° and 40° from the rotational axis, between 30° and 40° from the rotational axis, between 45° and 55° from the rotational axis, between 50° and 55° from the rotational axis, between 55° and 65° from the rotational axis, or between 45° and 65° from the rotational axis. In some embodiments the tapered drive surfaces may have a taper angle that is nominally 45° or nominally 52°.

Also disclosed is a torque transmission driver having
 a main body having a first end portion and a second end portion;
 the first end portion adapted to receive and transmit torque from a torque generation source;
 the second end portion opposite the first end portion comprising a shaped tapered bit corresponding to a recess of similar shape and taper in a plurality of differently-sized fasteners, wherein the shaped tapered bit has a taper angle between 15° and 65° from a rotational axis;
 wherein the shaped taper bit includes a drive surface corresponding to a first torque direction, the drive surface adapted to engage a corresponding tapered fastener surface at a lift angle less than 2°.

The second end portion of the torque transmission driver may be continuously tapered.

The shaped tapered bit may include a plurality of lobes including the drive surface and a trailing surface corresponding to a second torque direction. The drive surface may be approximately parallel to a radial of the shaped tapered bit. The distance between the drive surface and the trailing surface decreases along the taper of the shaped tapered bit. Alternatively or additionally, the taper of the shaped tapered bit may be different than the taper of the corresponding fastener recess.

In yet another aspect, a driver is disclosed comprising a central shaft having a gradually tapering diameter about an axis and adapted to engage a plurality of various fastener sizes to apply a torque to the fasteners, the driver having
 a lobular profile for engaging recesses on said fasteners, said lobular profile having a plurality of lobes, each lobe having a drive side and a trailing side, wherein the lobular profile has a taper angle between 15° and 65° from a rotational axis of the driver;
 wherein the drive side of each lobe is at approximately constant radial position along said gradually tapering diameter; and
 wherein the drive side of each lobe engages the fastener at a reduced lift angle to thereby reduce cam-out.

The distance between the drive side and the trailing side of the driver may reduce along the gradually tapering diameter. Alternatively or additionally, the lift angle may be between 0 and 2 degrees. In one alternative, the lift angle may be between 0 and 1 degree.

BRIEF DESCRIPTION OF THE DRAWINGS

FIG. 2 is a side view of the torque transmission driver,
FIG. 3 is an end view of the torque transmission driver of FIG. 2,
FIG. 4 is a cross-sectional view through the torque transmission driver of FIG. 2 from the section line 4-4,
FIG. 5 is a detail view taken from the cross-sectional view of FIG. 4.

DETAILED DESCRIPTION OF THE DRAWINGS

Figure 1A:
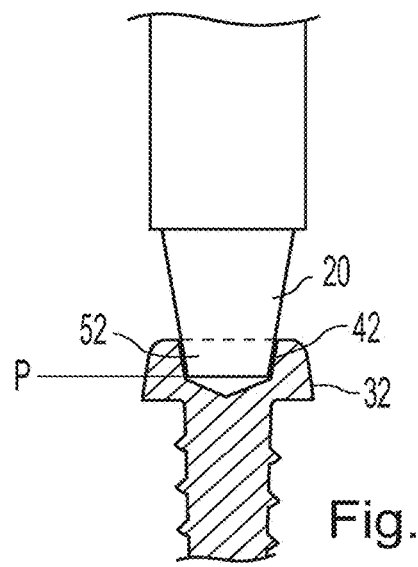
FIG. 1A-1D is a diagrammatical representation of a torque transmission driver engaging corresponding recesses of similar shape and taper in a plurality of fasteners.
Figure 1B:
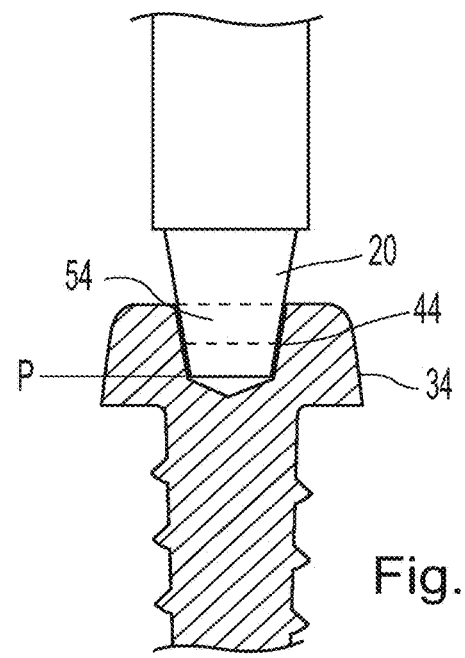
Figure 1C:
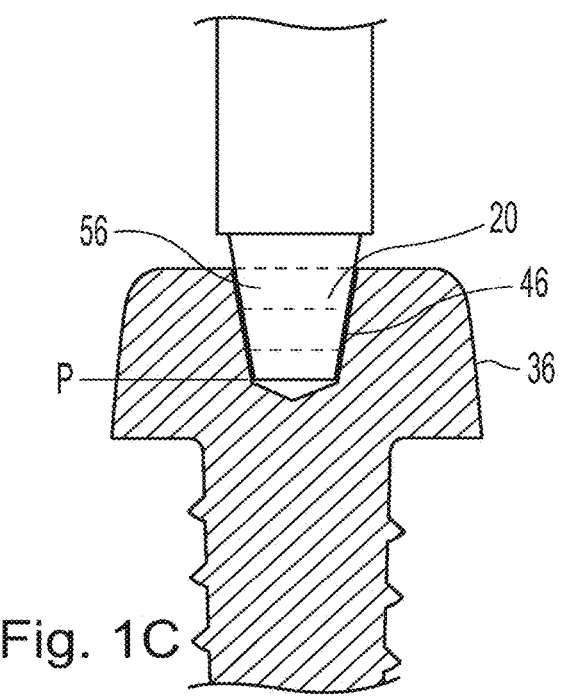
Figure 1D:
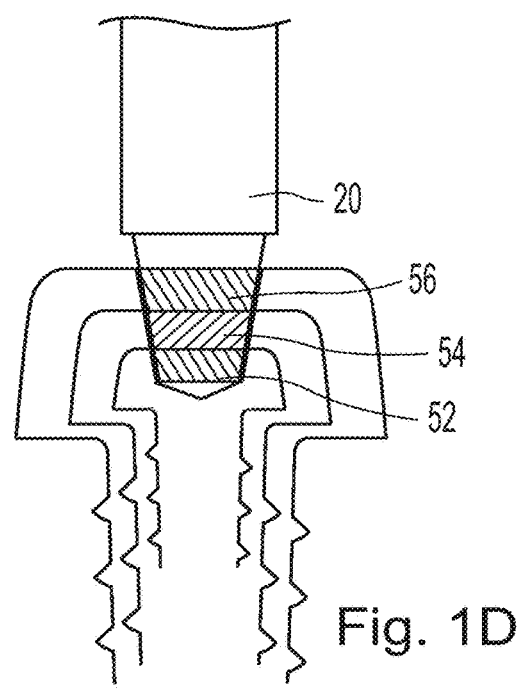

Referring now to FIGS. 1A-1D, a diagrammatical representation of a torque transmission driver 20 is shown engaging corresponding recesses of similar shape and taper in a plurality of fasteners 32, 34, 36 with differing recess sizes 42, 44, 46. The tapered drive surfaces of the bit, such as shown in FIGS. 1A-1D, may comprise a first tapered portion 52 operable to engage a first sized recess 42 in a first fastener 32, a second tapered portion 54 operable to engage a second sized recess 44 in a second fastener 34, and a third tapered portion 56 operable to engage a third sized recess 46 in a third fastener 36. As shown in FIG. 1D, in this application the third sized recess 46 of the third fastener 36 is larger than the second sized recess 44 of the second fastener 34, which is larger than the first sized recess 42 of the first fastener 32. As such, the torque transmission driver 20 is adapted to effectively drive more than one size fastener. While the torque transmission driver 20 shown in FIGS. 1A-1D is operable to effectively engage and drive three different size fastener recesses, the torque transmission driver 20 may be adapted for a desired plurality of fastener recess sizes and fastener sizes. The torque transmission driver typically may effectively engage and drive between 2 and 4 different fastener drive surfaces, such as recesses or projections, as discussed below.

The torque transmission driver 20 as shown in FIG. 2 includes a main body 60 having a first end portion 62 and a second end portion 64. The first end portion 62 is adapted to receive and transmit torque from a torque generation source, such as a power driver, a manually operated driver handle, a drill motor, or other torque generation source as desired. As shown in FIGS. 2 and 3, the second end portion 64 is opposite the first end portion 62 and includes a shaped tapered bit 66 having a series of six lobes 70 and troughs 72 about a rotational axis, shown as A in FIG. 2. The six lobes 70 and troughs 72 are symmetrically arranged about the rotational axis having a taper angle θ between 15° and 65° from the rotational axis as shown in FIG. 2. In one application, the taper angle θ is about 35°. Alternatively, the taper angle is about 40°. In yet another application, the taper angle is a selected angle between 25° and 40°. In yet another application, the taper angle is a selected angle between 45° and 65°. In yet other applications, the taper angle is a selected angle between 45° and 55°, between 50° and 55°, or between 55° and 65°. In yet other applications, the taper angle is approximately 45° or approximately 52°. An increased taper angle may provide greater strength to the recess reducing wear and failure of the fasteners and driver.

Figure 12:
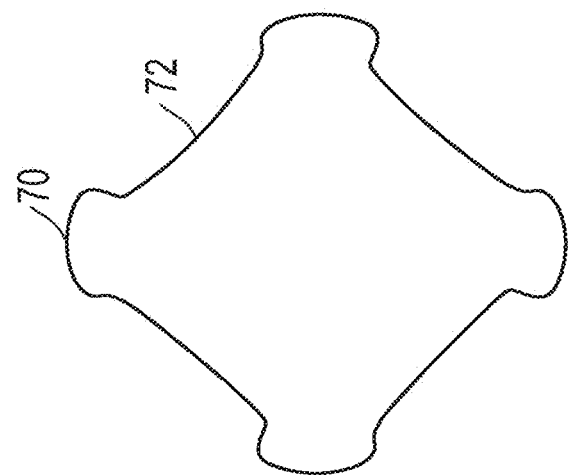
FIG. 12 is another alternative cross-sectional view through the section line 4-4 of FIG. 2.
Figure 11:
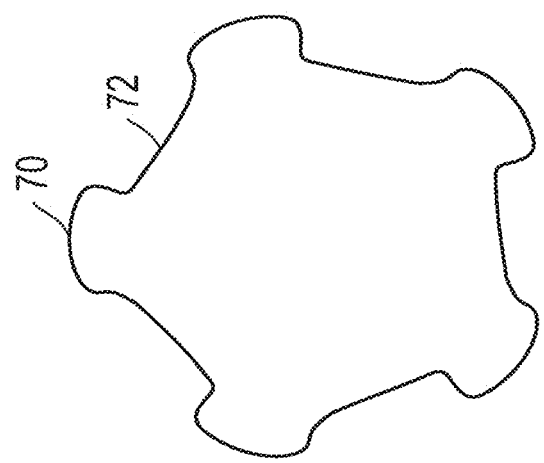
FIG. 11 is an alternative cross-sectional view through the section line 4-4 of FIG. 2.

The torque transmission driver 20 as shown in FIGS. 3 and 4 is a six-lobe driver. In one alternative, the torque transmission driver 20 and corresponding fasteners may include a five-lobe torque transmission system shown by example of the cross-section in FIG. 11, or may be a four-lobe torque transmission system shown by example of the cross-section in FIG. 12. In one application, a small fastener having a major thread diameter less than about 0.039 inch (1.0 millimeter) may utilize a four-lobe torque transmission system. Alternatively, a small fastener having a major thread diameter less than about 0.063 inch (1.6 millimeter) may utilize a four-lobe torque transmission system. In another application, a small fastener having a major thread diameter less than about 0.039 inch (1.0 millimeter) may utilize a five-lobe torque transmission system. In yet another alternative, a small fastener having a major thread diameter less than about 0.063 inch (1.6 millimeter) may utilize a five-lobe torque transmission system.

At any cross section through the tapered bit 66, such as the cross-section shown in FIG. 4, the outermost tip of each lobe 70 forms a lobe outer diameter 74, and the root of each trough 72 forms an inner diameter 76. The difference between the radius of the lobe outer diameter 74 and the radius of the inner diameter 76 is the lobe height 78. Additionally, each lobe has a width 80. As the bit 66 tapers toward the second end, each lobe has a tapering height and width. For each tapering lobe, the ratio of the lobe width to height is substantially the same for each lobe as it tapers along the axis.

The main body 60 may be a hexagonal shank having a length and cross-sectional size operable to be mounted in or otherwise engage the torque generation source such as a power driver. For example, in a common application, the main body may have a 5/16 inch hexagonal cross-section. Alternatively, the main body may have a ¼ hexagonal cross-section. The main body 60 may have any cross-sectional shape and size as desired corresponding to the torque generation source needed for the application. Alternatively, the main body may include a socket (not shown) for receiving a corresponding engagement on the torque generation source.

Figure 6:
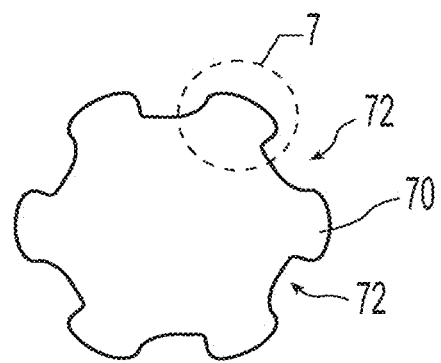
FIG. 6 is an alternative cross-sectional view through the torque transmission driver of FIG. 2 from the section line 4-4.
Figure 7:
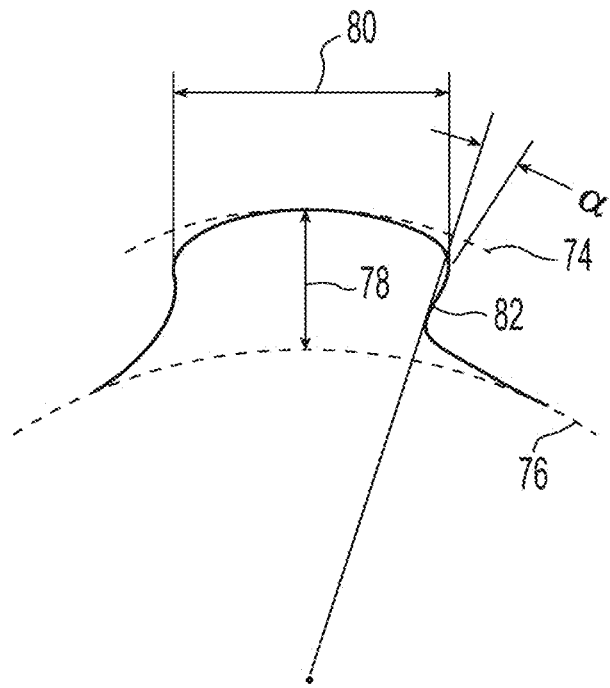
FIG. 7 is a detail view taken from the cross-sectional view of FIG. 6.

In the example of FIGS. 3-5, the transition between each lobe 70 and the trough 72 on at least one side of each lobe 70 forms a drive side transition 82 extending between an outer transition radius 94 and an inner transition radius 96. A drive angle $\alpha$ is measured between the drive side transition 82 and a radial line 98 extending from the rotational axis A and tangent to the inner transition radius 96 as shown in FIG. 5. The drive side transition 82 is adapted to engage a corresponding fastener surface for transferring torque from the driver to the fastener. The drive side transition is typically between about 20% and 60% of the lobe height. Alternatively, the drive side transition is between about 10% and 80% of the lobe height. In yet another alternative, the drive side transition is between about 20% and 40% of the lobe height. As shown in FIG. 5, the drive side transition 82 forms a drive angle $\alpha$ between 0° and 5°. Alternatively, as shown in FIGS. 6 and 7, the transition between each lobe and the trough on at least one side of each lobe 70 form the drive side transition 82 having a negative drive angle, where the drive angle $\alpha$ is between 0° and −10°. In one application, the drive angle $\alpha$ is between −2° and −10°. Alternatively, the drive angle $\alpha$ is between −3° and −10°. In yet another alternative, the drive side transition may form a drive angle between 0° and −3°. As used herein, a positive drive angle is defined as a drive side transition surface angled outwardly such that a line extending perpendicularly from the surface is directed toward the outside of or away from the inner diameter 76. Conversely, a negative drive angle is defined as a drive side transition surface angled inwardly such that a line extending perpendicularly from the surface is directed toward the inside of or toward the inner diameter 76. A zero degree drive angle provides a line perpendicular to the drive side transition surface that is parallel to a tangent of the inner and/or outer lobe diameters. Typically, the fastener drive angle is approximately the same as the bit drive angle to provide surface to surface contact. Alternatively, the fastener drive angle may be greater or less than the bit drive angle to accommodate clearances between the fastener and the driver as desired.

Figure 8:
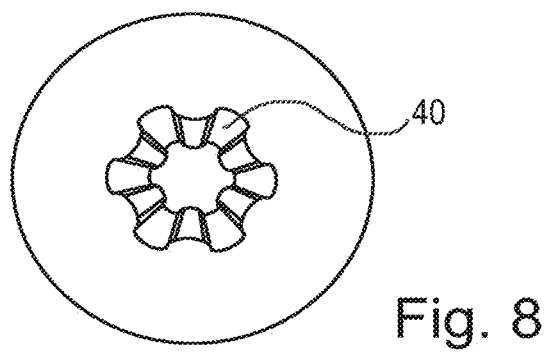
FIG. 8 is a top view of the head of a fastener.

The tapered driver 20 is operable to drive corresponding drive surfaces in a fastener in a male-female engagement. In one application as discussed above and shown in FIGS. 8-10, the fastener 36 has a drive end portion 86 and a lead end portion 88. The drive end portion 86 is operable to engage a torque transmission driver and the lead portion 88 is operable to fasten the fastener, such as by threads. The drive end portion 86 has drive surfaces 40 comprising a series of five or six fastener lobes 90 and fastener troughs 92 about a rotational axis having tapered drive surfaces $\gamma$ of between 15° and 65° from the rotational axis. The fastener lobes 90 and fastener troughs 92 are operable to engage corresponding drive surfaces of similar shape and taper on the driver. Each fastener lobe 90 has a tapering height and width, where the ratio of lobe width to height is a constant. In the fastener recess, the lobes 90 project into the recess to engage the driver troughs 72 on the driver. Similarly, the driver lobes 70 on the driver engage the fastener troughs 92 in the fastener recess.

Figure 9:
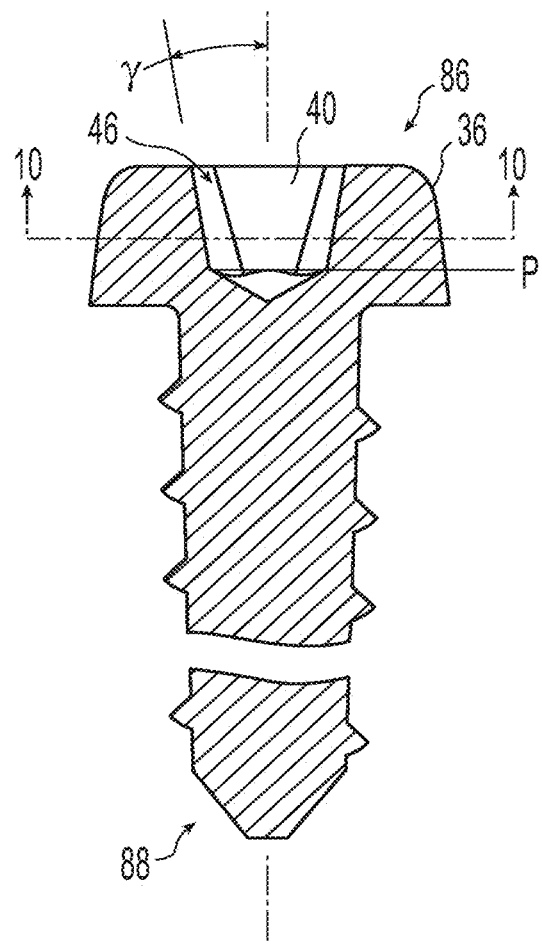
FIG. 9 is a partial cross-sectional view through the fastener of FIG. 8.
Figure 10:
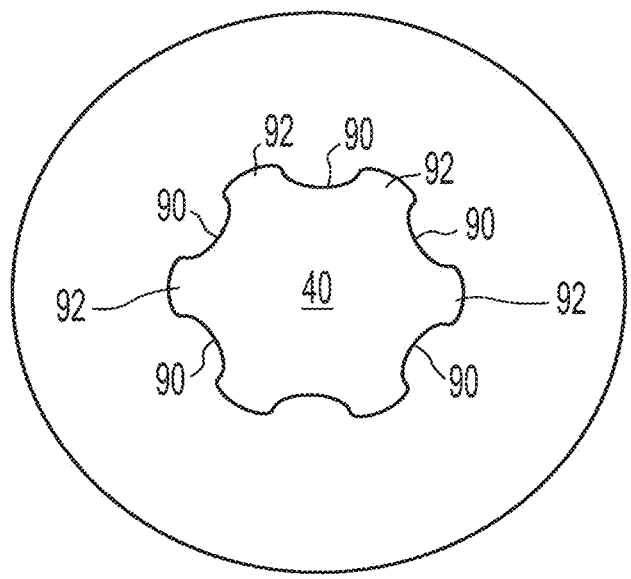
FIG. 10 is a cross-sectional view through the fastener of FIG. 9 from the section line 10-10.
Figure 13:
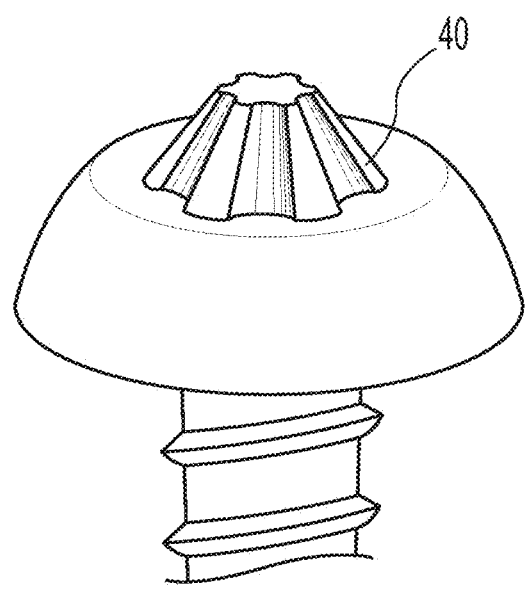
FIG. 13 is a perspective view of an alternative fastener of the present disclosure.

In another alternative, such as shown in FIG. 13, the fastener drive surfaces 40 comprise a projection of four, five, or six lobes and troughs to engage a corresponding recess in the driver (not shown). It is intended that discussion and references in the present application describing drive surfaces of the driver bit corresponding to a recess in the fastener such as shown in FIG. 9 also apply to drive surfaces as a projection on the fastener such as shown in FIG. 13. Similarly, discussion and references in the present application describing drive surfaces of the recess in the fastener such as shown in FIG. 9 also apply to drive surfaces in a recess in a driver for use in driving projections on a fastener such as shown in FIG. 13.

The lobes and troughs taper into the recess at least to a bottom plane, identified in FIG. 9 as "P". The bottom plane P as used herein is the approximate depth to which a corresponding driver is insertable into the recess. Below the bottom plane P, the bottom of the recess may be conical, hemispherical, hemispheroidal, flat, or any other arcuate or angled shape as desired for forming the recess. From the bottom plane P, the cross-sectional lobular shape of the recess tapers outwardly toward the top of the fastener recess having a taper angle $\gamma$. The recess taper angle $\gamma$ may be approximately the same as the driver taper angle $\theta$. Alternatively, the recess taper angle $\gamma$ may be slightly larger than the driver taper angle θ for manufacturing tolerances. In another alternative, the recess taper angle γ may be between 0.5° and 5° larger than the driver taper angle θ. As one example, the recess taper angle γ may be specified between 35° and 36°, and the driver taper angle θ specified between 34° and 35°, where nominally the recess taper angle γ and the driver taper angle θ are 35°. In another example, the recess taper angle γ may be specified between 52° and 53°, and the driver taper angle θ specified between 51° and 52°, where nominally the recess taper angle γ and the driver taper angle θ are each 52°. In another example, the recess taper angle γ may be specified between 45° and 46°, and the driver taper angle θ specified between 44° and 45°, where nominally the recess taper angle γ and the driver taper angle θ are 45°. However, the recess taper angle γ and the driver taper angle θ may be any angle between 15° and 65° from the rotational axis as desired.

A fastening system may be provided whereby one torque transmission driver 20 is operable to drive a plurality of different sized fasteners 32, 34, 36. The tapered driver 20 may be configured to drive two or more different sized fasteners with the same size of bit 66. In the example of FIG. 1A-1D, the tip portion of the tapered bit has a cross-sectional size forming the first tapered portion 52 operable to engage fasteners corresponding to the size of the first tapered portion. The second tapered portion 54 may be adjacent the first tapered portion 52 in a position on the tapered bit having a cross-sectional size larger than the first tapered portion. The second tapered portion 54 is operable to engage fasteners corresponding to the size of the second tapered portion. Similarly, a third tapered portion 56 is adjacent the second tapered portion 54 operable to engage fasteners corresponding to the size of the third tapered portion. For example, one driver may be adapted to drive associated sizes 6, 8 and 10 screws, in which the first tapered portion 52 of the bit is adapted to the #6 screw, the second tapered portion 54 is adapted to the #8 screw, and the third tapered portion 56 is adapted to the #10 screw. In other alternatives, one driver may be adapted to drive associated sizes 8, 10 and 12 screws, and another driver adapted to drive associated ¼ inch, 5⁄16 inch, and ⅜ inch screws. Alternatively, a driver may be adapted to drive a plurality of small fasteners, such as size #0 and #1 fasteners, or smaller, associated to the driver. The driver may be adapted to drive two or more sequentially-sized associated fasteners as desired.

For one driver 20 to drive a plurality of fasteners 32, 34, 36 of differing sizes, each fastener has drive surfaces 40 corresponding to the driver such that the differing sizes of drive surfaces have at least one cross-section substantially the same in size and shape. Specifically, with reference to FIGS. 1A-1D, the size and shape of the cross-section of the recesses 42, 44, 46 at the bottom plane P is the approximately the same for each fastener associated with the desired drive bit 20. Additionally, the corresponding cross-sectional size and shape of the driver 20 at the second end 64 is approximately the same as the fastener size and shape at the bottom plane P. For certain applications, the cross-sectional size and shape of the driver 20 at the second end 64 is smaller than the fastener size and shape at the bottom plane P for ease of insertion of the driver into, and removal from, the recess. Alternatively, the cross-sectional size and shape of the driver 20 at the second end 64 is slightly larger than the fastener size and shape at the bottom plane P such that interference between the driver and fastener cause the fastener to releasably stick to the driver so that an assembler does not have to hold the fastener onto the driver.

The drive surfaces of the fastener and the correspondingly configured bit drive surfaces are configured for the fastener drive surfaces to engage the corresponding bit drive surfaces an engagement depth sufficient to permit good application of torque from the driver bit to the fastener. For example, a small fastener having a major thread diameter less than about 0.039 inch (1.0 millimeter) may have an effective engagement depth of the drive surfaces of less than 0.010 inch (0.25 millimeter). For larger fasteners, such as having a major thread diameter greater than about 0.236 inch (6.0 millimeter), the effective engagement depth may be 0.06 inch (1.5 millimeter), or greater.

For certain larger fastener applications, the tapered fastener drive surfaces and associated driver may be manufactured using traditional cold-heading and/or machining techniques. However, smaller fasteners tend to require increased precision. In one application the fastener drive surfaces are impressed or embossed onto the fastener by stamping. For certain applications, such as for small fasteners having a major thread diameter less than about 0.039 inch (1.0 millimeter), or alternatively having a major thread diameter less than about 0.063 inch (1.6 millimeter), the drivers may be made by electrical discharge machining (EDM) or electrochemical machining (ECM). It is contemplated that hobbing may also be used for certain suitable geometries.

The present torque transmission drivers may be steel or aluminum as desired for the application. In one alternative, the steel is a medium carbon steel, such as AISI S2, 6150, 8650, 8660, or other tool steel compositions or alloy steel compositions as desired for hardenability and strength. The medium carbon steel may be hardened after the driver is made. After the torque transmission driver is formed, the steel driver may be hardened to a hardness of 58-62 HRC. Alternatively, the steel driver may be hardened to a hardness greater than 52 HRC.

Figure 14A:
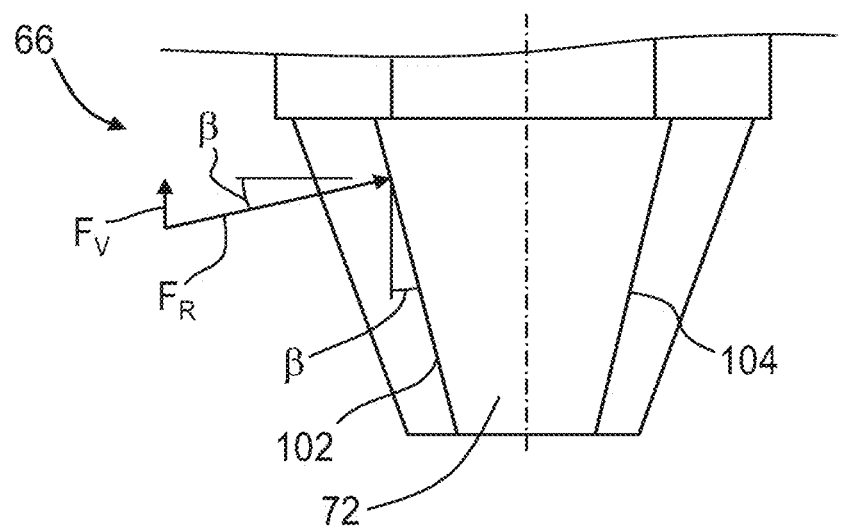
FIG. 14A is a detail view of the torque transmission driver of FIG. 2.

As discussed above, the lobes 70 of the driver shown, for example, in FIG. 3, taper as the bit 66 is tapered. In these embodiments, when the size of the cross sectional bit (see FIGS. 2-4) is reduced, the proportions of the lobes 70 to troughs 72 will remain substantially the same. Because the lobes are tapered, the reaction force exerted against the driver lobe from the fastener, schematically represented as "$F_R$" in FIG. 14A, includes a lift angle β. The reaction force $F_R$ includes a component along the driver axis, schematically represented as "$F_V$" in FIG. 14A, in a direction tending to lift the driver 20 and reduce driver engagement in the fastener recess during driving of the fastener. This process is known as "cam out" because as driving torque increases and the component force $F_V$ increases, when a force opposing the component force $F_V$ is not applied the driver may lift in a direction away from the fastener recess, and in some instances the driver may lift enough to disengage from the fastener recess.

Figure 14B:
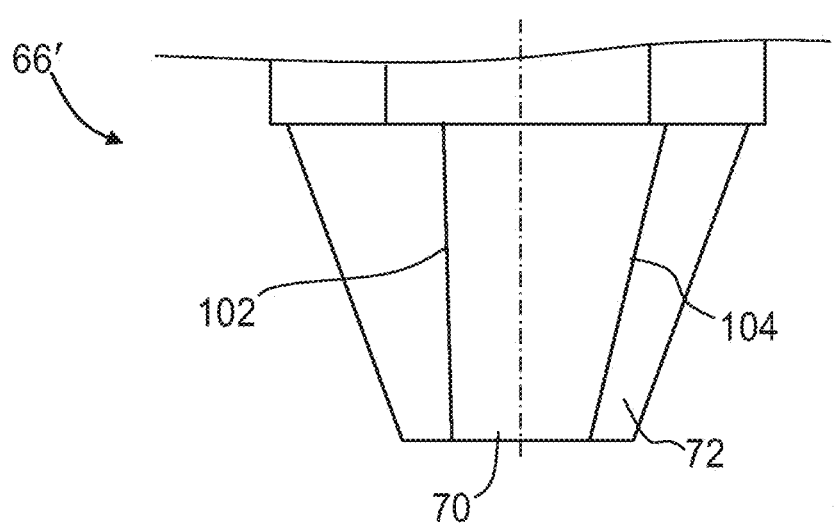
FIG. 14B is a detail view of an alternative torque transmission driver of the present disclosure.

The presently disclosed fastener system inhibits cam out, and for certain applications it may be desired to further reduce the forces causing cam out. In one example shown in FIG. 14B, the drive surface 102 of the driver 66' may be modified while the trailing surface 104 may be tapered as previously explained. The drive surface 102 may be substantially parallel to the axis of rotation of the driver, as shown in FIG. 14B, reducing the lift angle β to be at or near zero degrees, depending on manufacturing tolerances. In one alternative, the lift angle on the drive surface 102 may be between 0° and 2°. The lift angle may be selected to reduce the amount of vertical force imposed on the driver when a torque is applied to the fastener through the driver. As torque requirements increase, it may be desirable for the lift angle to be at or near zero degrees. In low-torque arrangements, the lift angle may not need to be highly constrained, as determined by the application. In the arrangement shown in FIG. 14B having the angle of the drive side approximately zero degrees, the lift angle β will be near zero when the driver is used to tighten a fastener with a corresponding recess, reducing the potential for cam-out during fastening. When the driver shown in FIG. 14B is used to loosen a fastener, the lift angle on the trailing surface 104, which drives the removal of the fastener, may be greater than zero. The fastener may be designed to accommodate separate drivers for installation and removal of fasteners, which may be desired for tamper-resistant applications.

The driver 66' shown in FIG. 14B enables less taper on the corresponding drive side of the lobes in the fastener recess, which increases the amount of material in the lobes of the fasteners making the fastener stronger. The added material in the fastener lobes may cause the difference in the torque between the driver and the fastener to be closer in amounts, further assisting in inhibiting cam-out and improving service of the driver.

Figure 15:
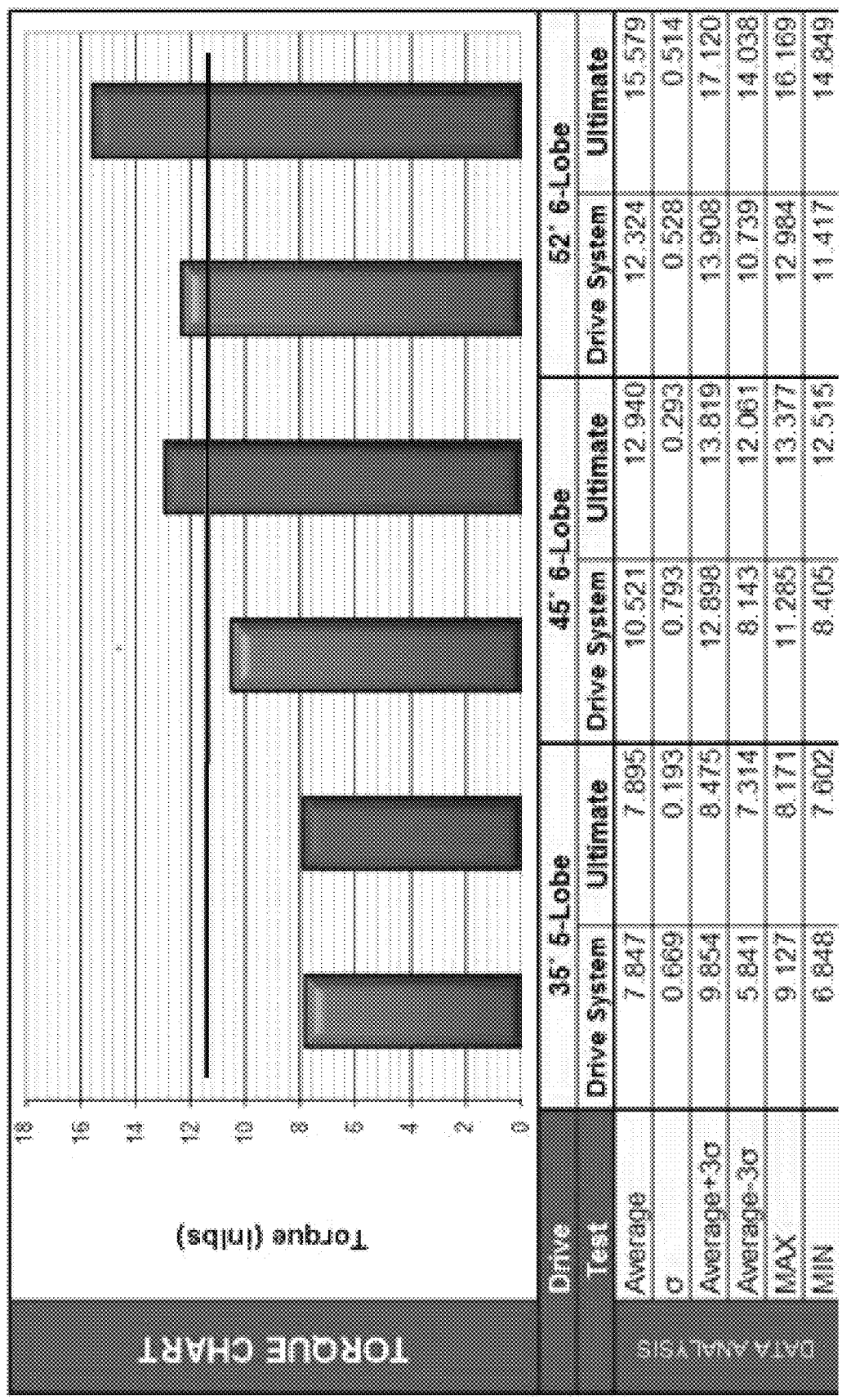
FIG. 15 is a chart of test data for selected embodiments of a tapered lobular driver and fastener system.

Referring now to FIG. 15, tests were conducted of the disclosed tapered lobular driver and fastener system. In each instance, a set of tapered lobular drive bits having a selected taper angle were engaged corresponding recesses. As shown in FIG. 15, the three tests included a five-lobe drive bit and recess having a taper angle of 35°, a six-lobe drive system having a taper angle of 45°, and a six-lobe drive system having a taper angle of 52°. The drive bits were each torque until the drive system failed to identify the strength of the system. In addition, the drive bits were tested in both a standard fastener recess, as well as a recess formed in high speed steel having significantly increased strength in order to separately analyze the strength of the drive bit. The black reference line indicates the specified drive bit strength of a prior art commercially available six-lobe straight-walled drive bit. As shown, the six-lobe drive bits having taper angles of 45° and 52° both exceeded the drive bit strength of the six-lobe straight-walled drive bit. The tapered lobular driver and fastener thus provide an improvement in drive system strength in combination with the ability to use a single driver with multiple size fasteners, all while reducing the potential for cam-out during fastening.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected by the appended claims and the equivalents thereof.

What is claimed is:

1. A torque transmission driver engageable with a plurality of fasteners having a mix of at least two sizes of tapered drive surfaces comprising:
    a main body having a first end portion and a second end portion,
    the first end portion adapted to receive and transmit torque from a torque generation source,
    the second end portion opposite the first end portion comprising a shaped tapered bit having drive surfaces comprising an alternating series of four, five or six driver lobes and driver troughs about a rotational axis having tapered bit drive surfaces with a taper angle between 15 and 65° from the rotational axis,
    the tapered bit drive surfaces comprising a first tapered portion operable to engage drive surfaces of a first sized fastener and a second tapered portion operable to engage drive surfaces of a second sized fastener, the drive surfaces of the second sized fastener being larger than the drive surfaces of the first sized fastener, each driver lobe having a tapered height and width with a substantially constant ratio of lobe width to height regarding arbitrary cross-section surfaces in an axial direction of the torque transmission driver.

2. The torque transmission driver according to claim 1, the tapered drive surfaces comprising a drive side transition extending between each driver lobe and a trough on at least one side of each driver lobe and engaging a corresponding fastener surface, a drive angle of the drive side transition being between 0° and 5°.

3. The torque transmission driver according to claim 2 where the drive side transition is between about 20% and 60% of the lobe height.

4. The torque transmission driver according to claim 1, where the fastener tapered drive surfaces form a projection, and the tapered bit is operable to engage at least two sizes of fastener drive surfaces.

5. The torque transmission driver according to claim 1, the tapered drive surfaces comprising a drive side transition extending between each driver lobe and a trough on at least one side of each driver lobe and engaging a corresponding fastener surface, a drive angle of the drive side transition being between 0° and −10°.

6. The torque transmission driver according to claim 5 where the drive side transition is between about 20% and 60% of the lobe height.

7. The torque transmission driver according to claim 1, where the fastener tapered drive surfaces form a recess, and the tapered bit is operable to engage at least two sizes of fastener drive surfaces.

8. The torque transmission driver according to claim 1 where the tapered bit drive surfaces have a taper angle between 45° and 65° from the rotational axis.

9. The torque transmission driver according to claim 1 where the tapered bit drive surfaces have a taper angle between 45° and 55° from the rotational axis.

10. The torque transmission driver according to claim 1 where the tapered bit drive surfaces engage at least one of said first sized fastener and second sized fastener has a major thread diameter smaller than 0.039 inch (1.0 millimeter).

11. The torque transmission driver according to claim 1 where the tapered bit drive surfaces engage at least one of said first sized fastener and second sized fastener has a major thread diameter smaller than 0.063 inch (1.6 millimeter).

12. A fastener system comprising:
    a plurality of fasteners having a mix of at least two sizes of tapered drive surfaces, each fastener having a drive end portion with the tapered drive surfaces and a lead end portion,
    the drive end portion of each fastener operable to engage a torque transmission driver and the lead portion operable to fasten the fastener,
    the fastener tapered drive surfaces comprising an alternating series of four, five or six fastener lobes and fastener troughs about a rotational axis and having a taper angle between 15 and 65° from the rotational axis operable to engage corresponding drive surfaces of a similar shape and taper on the torque transmission driver, each fastener lobe of the drive surfaces having a tapered height and width with a substantially constant ratio of lobe width to height regarding arbitrary cross-section surfaces in an axial direction of the fastener, a torque transmission driver comprising a main body having a first end portion and a second end portion,
the first end portion adapted to receive and transmit torque from a torque generation source,
the second end portion opposite the first end portion comprising a shaped tapered bit comprising a series of alternating five or six driver lobes and driver troughs about a rotational axis forming tapered bit drive surfaces having a taper angle between 15 and 65° from the rotational axis operable to engage the at least two sizes of drive surfaces of the plurality of fasteners,
the tapered bit drive surfaces having a first tapered portion operable to engage drive surfaces of a first sized fastener and a second tapered portion adapted to engage drive surfaces of in a second sized fastener, the drive surfaces of the second sized fastener being larger than the drive surfaces of the first sized fastener, each driver lobe having a tapering height and width with a substantially constant ratio of lobe width to height regarding arbitrary cross-section surfaces in an axial direction of the torque transmission driver,
the driver lobes and troughs of the torque transmission driver complementally engaging the fastener troughs and lobes of the fasteners.

13. The fastener system according to claim 12, each of the at least two sizes of fastener drive surfaces having at least one cross section substantially the same.

14. The fastener system according to claim 12, the tapered bit drive surfaces comprising a drive side transition extending between each driver lobe and a trough on at least one side of each driver lobe and engaging a corresponding fastener surface, a drive angle of the drive side transition being between 0° and 5°.

15. The fastener system according to claim 14 where the drive side transition on the tapered bit is between about 20% and 60% of the lobe height.

16. The fastener system according to claim 12, the tapered bit drive surfaces comprising a drive side transition extending between each driver lobe and a trough on at least one side of each driver lobe and engaging a corresponding fastener surface, a drive angle of the drive side transition being between 0° and −10°.

17. The fastener system according to claim 16 where the drive side transition is between about 20% and 60% of the lobe height.

18. The fastener system according to claim 12, where the fastener tapered drive surfaces form a recess, and the tapered bit is operable to engage at least two sizes of fastener drive surfaces.

19. The fastener system according to claim 12, where the fastener tapered drive surfaces form a projection, and the tapered bit is operable to engage at least two sizes of fastener drive surfaces.

20. The fastener system according to claim 12 where the tapered bit drive surfaces of the torque transmission driver and the corresponding fastener tapered drive surfaces have a taper angle between 45° and 65° from the rotational axis.

21. The fastener system according to claim 12 where the tapered bit drive surfaces of the torque transmission driver and the corresponding fastener tapered drive surfaces have a taper angle between 45° and 55° from the rotational axis.

22. The fastener system according to claim 12 where the plurality of fasteners includes fasteners having a major thread diameter smaller than 0.039 inch (1.0 millimeter).

23. The fastener system according to claim 12 where the plurality of fasteners includes fasteners having a major thread diameter smaller than 0.063 inch (1.6 millimeter).

24. A selection of a plurality of fasteners engageable with a torque transmission driver comprising:
a plurality of fasteners having a mix of at least two sizes of tapered drive surfaces, each of the at least two sizes of drive surfaces having a cross-sectional shape, each fastener having a drive end portion and a lead end portion,
the drive end portion of each fastener operable to engage a torque transmission driver and the lead portion operable to fasten the fastener,
the drive end portion of each fastener comprising an alternating series of four, five or six fastener lobes and fastener troughs about a rotational axis forming the tapered drive surfaces having a taper angle between 15 and 65° from the rotational axis operable to engage corresponding drive surfaces of similar shape and taper on the torque transmission driver, each fastener lobe of the tapered drive surfaces having a tapered height and width with a substantially constant ratio of lobe width to height regarding arbitrary cross-section surfaces in an axial direction of the fastener.

25. The selection of fasteners according to claim 24, each of the at least two sizes of fastener tapered drive surfaces having at least one cross-section substantially the same.

26. The selection of fasteners according to claim 24 where a transition between each fastener lobe and a trough on at least one side of each fastener lobe forms a drive side transition having a drive angle adapted to engage a corresponding driver surface, the drive angle being between 0° and 5°.

27. The selection of fasteners according to claim 26 where the drive side transition is between about 20% and 60% of the lobe height.

28. The selection of fasteners according to claim 24 where a transition between each fastener lobe and a trough on at least one side of each fastener lobe forms a drive side transition having a drive angle adapted to engage a corresponding driver surface, the drive angle being between 0° and −10°.

29. The selection of fasteners according to claim 28 where the drive side transition is between about 20% and 60% of the lobe height.

30. The selection of fasteners according to claim 24, where the fastener tapered drive surfaces form a recess.

31. The selection of fasteners according to claim 24, where the fastener tapered drive surfaces form a projection.

32. The selection of fasteners according to claim 24 where the tapered drive surfaces have a taper angle between 45° and 65° from the rotational axis.

33. The selection of fasteners according to claim 24 where the tapered drive surfaces have a taper angle between 45° and 55° from the rotational axis.

34. The selection of fasteners according to claim 24 where the plurality of fasteners includes fasteners having a major thread diameter smaller than 0.039 inch (1.0 millimeter).

35. The selection of fasteners according to claim 24 where the plurality of fasteners includes fasteners having a major thread diameter smaller than 0.063 inch (1.6 millimeter).

36. A torque transmission driver comprising:
a main body having a first end portion and a second end portion;
the first end portion adapted to receive and transmit torque from a torque generation source;

the second end portion opposite the first end portion comprising a bit corresponding to a recess of similar shape and taper in a plurality of differently-sized fasteners, wherein the bit has a taper angle between 15° and 65° from a rotational axis;

wherein the bit includes alternating driver lobes and driver troughs about a rotational axis of the torque transmission driver and driver surfaces corresponding to a first torque direction, each of the drive surfaces adapted to engage a corresponding tapered fastener surface at a lift angle less than 2°, and wherein each of the drive surfaces includes a drive side transition extending between each driver lobe and a trough on at least one side of each driver lobe and engaging a corresponding fastener surface, and a drive angle of the drive side transition is between 0° and 5°.

37. The torque transmission driver according to claim 36 where bit includes a trailing surface corresponding to a second torque direction and the trailing surface is continuously tapered.

38. The torque transmission driver according to claim 36 where the drive surfaces are approximately parallel to a rotational axis of the torque transition driver.

39. The torque transmission driver according to claim 38 wherein the bit includes a plurality of lobes, wherein the plurality of lobes include the drive surfaces and a trailing surface corresponding to a second torque direction.

40. The torque transmission driver according to claim 39 wherein the distance between the drive surface and the corresponding trailing surface decreases along the taper of the bit.

41. The torque transmission driver according to claim 40 wherein the taper of the bit is different than the taper of the corresponding fastener recess.

42. The torque transmission driver according to claim 36, wherein the bit has a taper angle between 45° and 55° from the rotational axis.

43. A torque transmission driver comprising:

a main body having a first end portion and a second end portion;

the first end portion adapted to receive and transmit torque from a torque generation source;

the second end portion opposite the first end portion comprising a bit corresponding to a shape in a plurality of differently-sized fasteners;

wherein the bit includes an alternating driver lobes and driver troughs about a rotational axis of the torque transmission driver and drive surfaces corresponding to a first torque direction, each of the drive surfaces adapted to engage a corresponding tapered fastener surface at a lift angle less than 2° and wherein each of the drive surfaces includes a drive side transition extending between each driver lobe and a trough on at least one side of each driver lobe and engaging a corresponding fastener surface, and a drive angle of the drive side transition is between −2° and −10°.

* * * * *